J. A. GORRIE.
APPARATUS FOR SPLITTING LOGS AND THE LIKE.
APPLICATION FILED NOV. 4, 1921.

1,406,552.

Patented Feb. 14, 1922.
5 SHEETS—SHEET 1.

INVENTOR:
James A. Gorrie
By Wm Wallace White
ATTY.

J. A. GORRIE.
APPARATUS FOR SPLITTING LOGS AND THE LIKE.
APPLICATION FILED NOV. 4, 1921.

1,406,552.

Patented Feb. 14, 1922.

5 SHEETS—SHEET 2.

INVENTOR:
James A. Gorrie.
By Wm Wallace White
ATTY.

J. A. GORRIE.
APPARATUS FOR SPLITTING LOGS AND THE LIKE.
APPLICATION FILED NOV. 4, 1921.

1,406,552.

Patented Feb. 14, 1922.
5 SHEETS—SHEET 3.

J. A. GORRIE.
APPARATUS FOR SPLITTING LOGS AND THE LIKE.
APPLICATION FILED NOV. 4, 1921.

1,406,552.  Patented Feb. 14, 1922.

5 SHEETS—SHEET 4.

INVENTOR:
James A. Gorrie
By Wm Wallace White
ATTY.

J. A. GORRIE.
APPARATUS FOR SPLITTING LOGS AND THE LIKE.
APPLICATION FILED NOV. 4, 1921.

1,406,552.

Patented Feb. 14, 1922.

5 SHEETS—SHEET 5.

INVENTOR
James A. Gorrie
BY
Wm Wallace White
ATTY.

UNITED STATES PATENT OFFICE.

JAMES ANDREW GORRIE, OF AUCKLAND, NEW ZEALAND.

APPARATUS FOR SPLITTING LOGS AND THE LIKE.

1,406,552.   Specification of Letters Patent.   Patented Feb. 14, 1922.

Application filed November 4, 1921. Serial No. 512,780.

*To all whom it may concern:*

Be it known that I, JAMES ANDREW GORRIE, a subject of the King of Great Britain, residing at 19 Pitt Street, Auckland, in the Province of Auckland, New Zealand, have invented new and useful Improvements in Apparatus for Splitting Logs and the like, of which the following is a specification.

My invention has for its object to provide means for splitting logs and the like in a simple and expeditious manner. A further object of the invention is to provide a log splitting apparatus adapted to split a log into the required number of pieces in one direction at a single operation.

In carrying out my invention a number of adjustable knives or wedges are provided, which slide in guides fixed to the underside of an overhead plate. The centre knife, or wedge, is fixed to the overhead plate, and the knives or wedges, on each side, can be moved towards or away from the centre or middle wedge, so that the width of the split portions of the log, can be varied as desired. Further these knives or wedges can oscillate so as to follow the grain of the wood. Provision is made for turning the log (after the first splitting operation) say through half of a revolution. If a quarter revolution is made, and the splitting operation is repeated, then the number of previously split pieces is squared. Provision is also made for adjusting the log vertically, and laterally, relative to the knives or wedges.

In order that my said invention and the manner of performing the same may be properly understood, I hereunto append five sheets of explanatory drawings to be hereinafter referred to in describing my invention.

Figure 1:
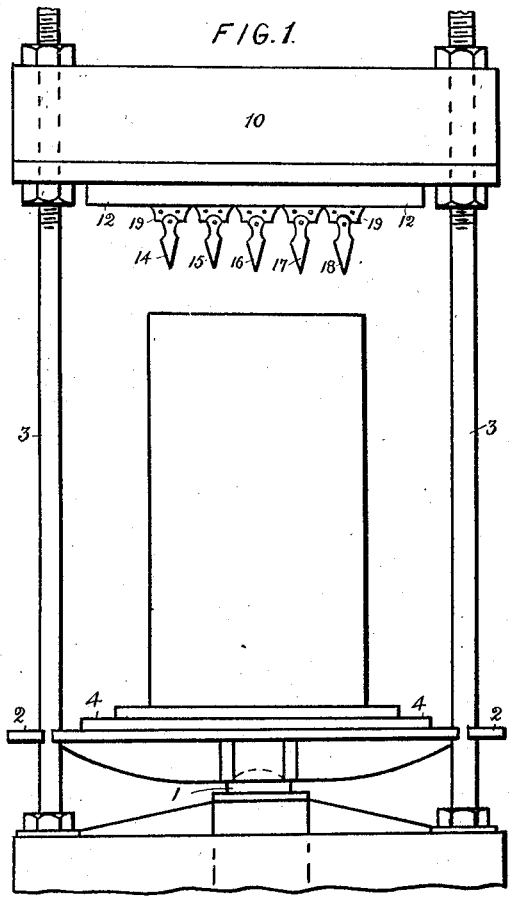
Figure 2:
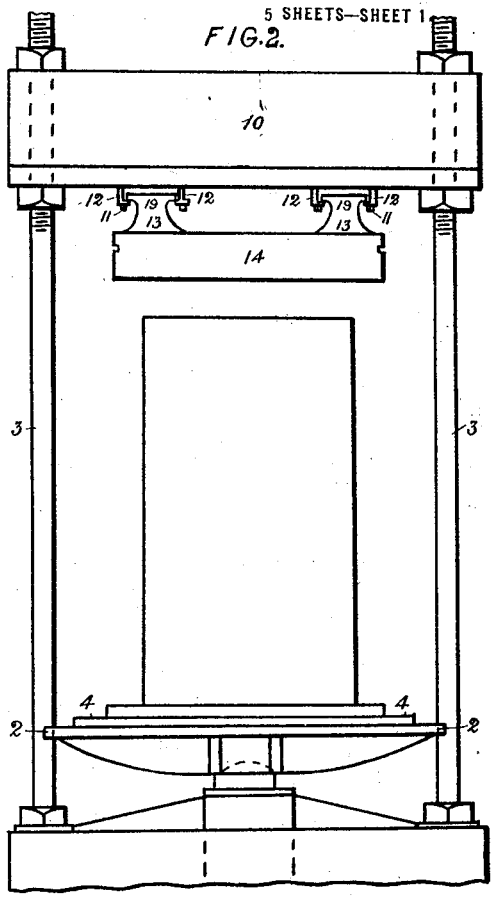
Figure 3:
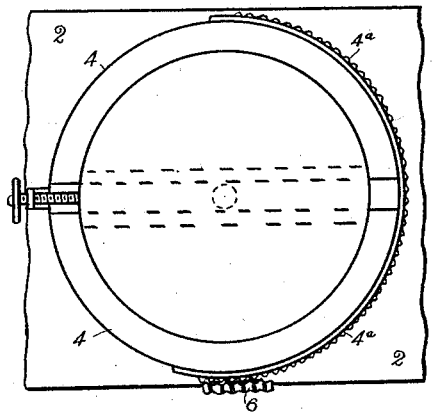
Figure 4:
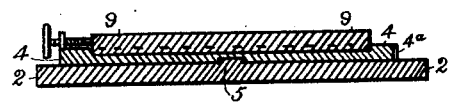
Figure 5:
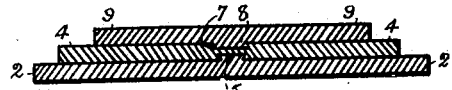
Figure 6:
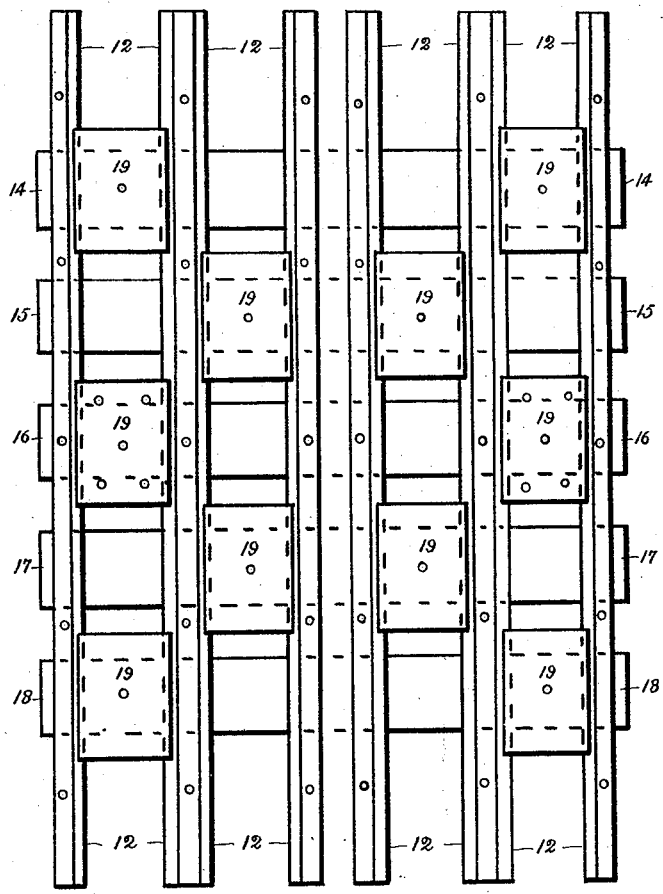
Figure 7:
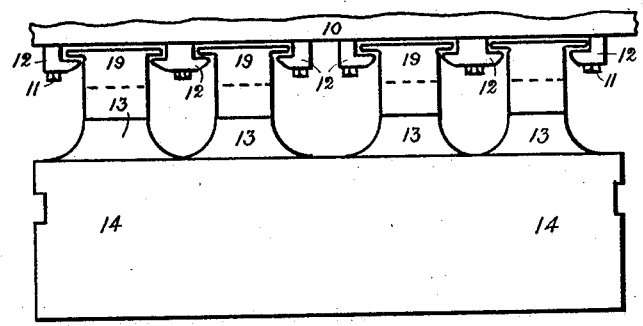
Figure 8:
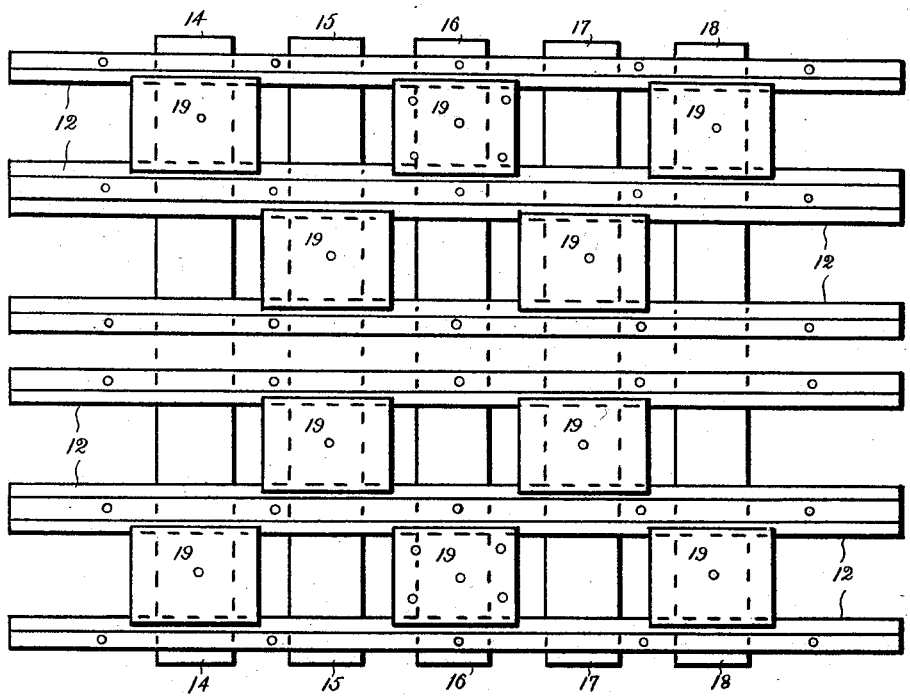
Figure 9:
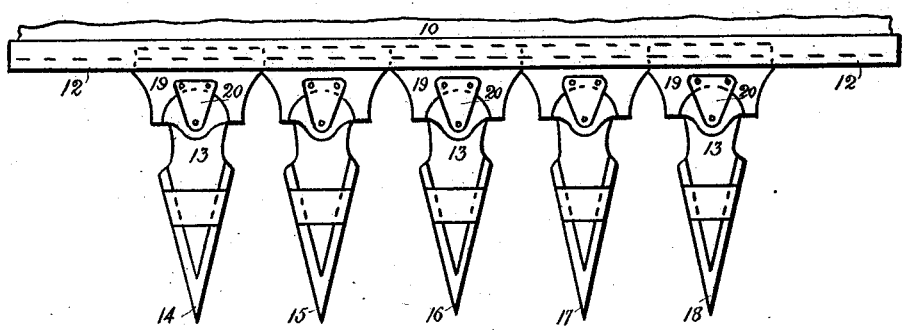
Figure 10:
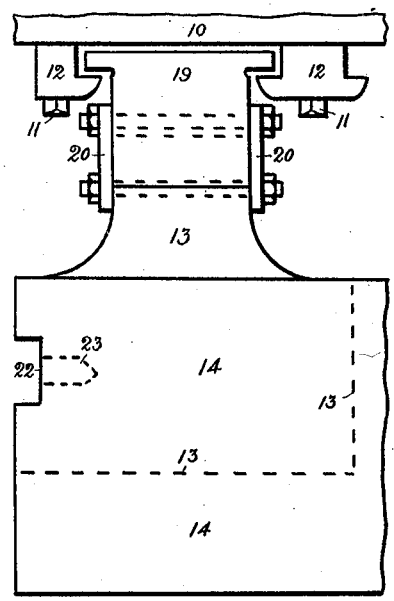
Figure 15:
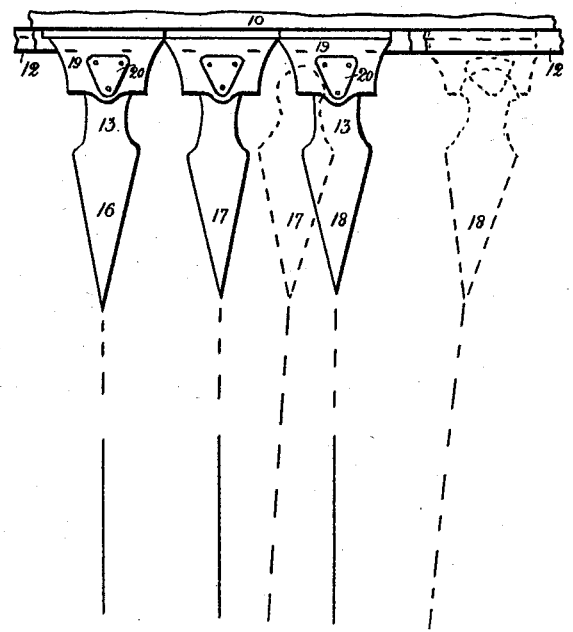
Figure 11:
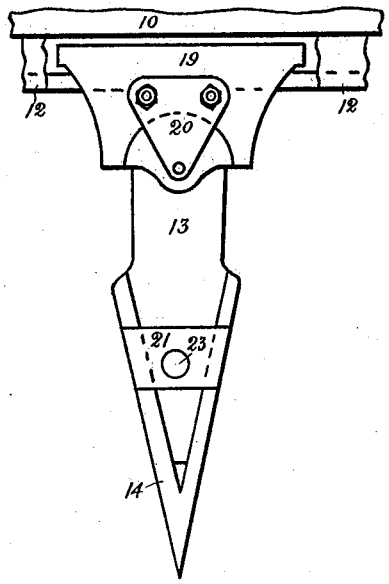
Figure 11:
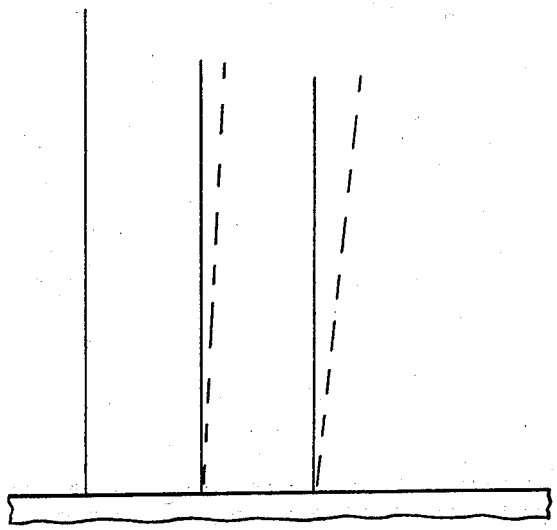
Figure 12:
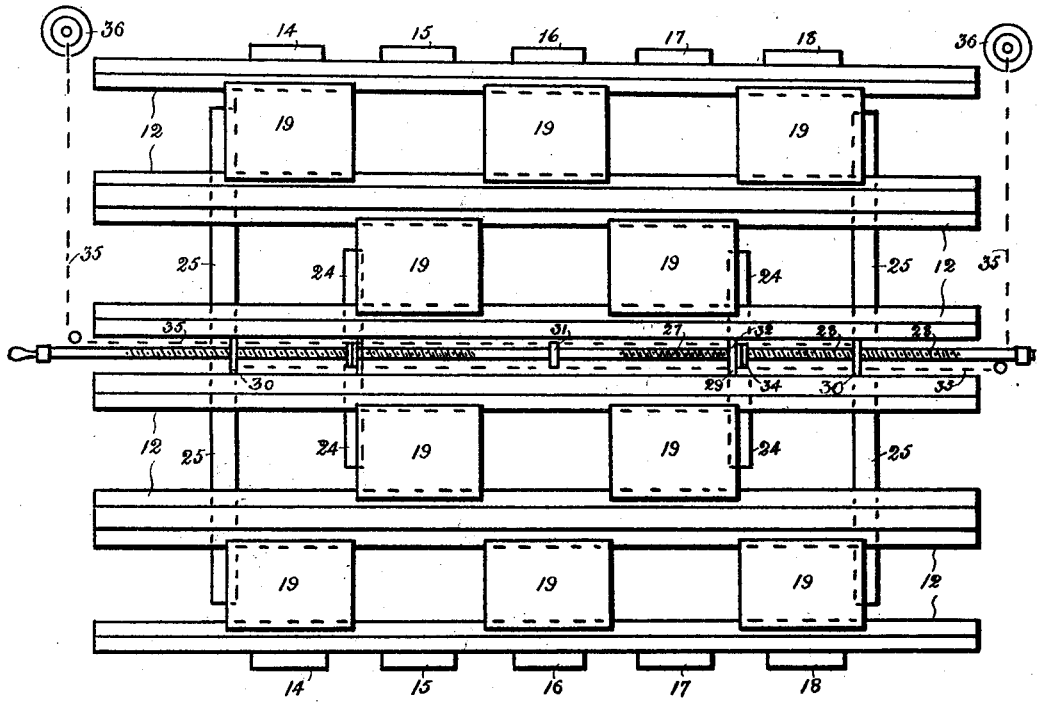
Figure 13:
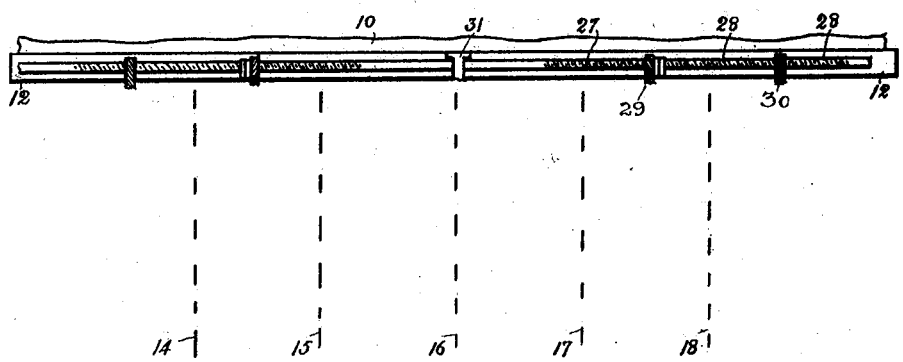
Figure 14:
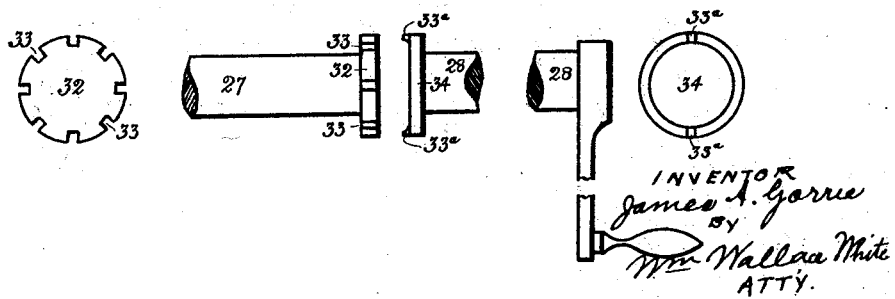

Figures 1, and 2, are respectively an end elevation and a side elevation of the improved apparatus for splitting logs. Figure 3, is a plan of the plates on which the log is supported, and means for adjusting and turning them respectively. Figures 4, and 5, are transverse sections of Figure 3, at right angles to each other. Figures 6, and 7, are respectively a plan, and an end elevation of the guides in which the brackets, supporting the knives or wedges, slide. Figure 8, is a view at right angles to Figure 6, and Figure 9, is an end elevation of the knives or wedges. Figure 10, is a side elevation, drawn to a larger size, of a portion of a wedge and Figure 11, is an end elevation. Figures 12 and 13, are a plan, and a side elevation showing the means for setting the wedges, and Figure 14, is a detailed view. Figure 15, is a diagram showing the position of certain wedges on completing a splitting operation.

In these drawings the same reference numerals are used to mark the same or like parts wherever they are repeated.

As shown in Figures 1 and 2, the log is raised and forced against the wedges by hydraulic power. A ram 1, is provided with a platform 2, and columns or standards 3, serve as guides for the platform. The outer end of the ram 1, is preferably, convexly shaped to coincide with a concave recess in the underside of the platform. The ends of the platform 2, may, if desired, be supported on springs. On the platform 2, is arranged a plate 4, having a central aperture with which engages a pin 5 (Figure 5), formed on or fixed to the platform 2. The plate 4, has teeth 4ª, fixed on a part of its periphery which engage with a worm 6, whereby the plate 4, can be partially turned. A dovetailed recess 7, (Figures 4 and 5) is formed in the plate 4, to receive a corresponding feather or projection 8, on a plate 9, whereby the latter (on which the log rests) can not only be partially rotated, but also adjusted laterally.

On the columns or standards 3, there is adjustably supported a bridge piece 10, whose ends may, if desired, work against springs, so that in conjunction with the platform 2, compensation is provided for any horizontal irregularity in the ends of the log. To the underside of said bridge piece there is connected by studs 11, a number of guides 12, (Figures 7, 8, and 9) in which slide the upper ends of depending brackets 13, carrying splitting knives or wedges 14, 15, 16, 17 and 18, each wedge being carried by two slides 19. The brackets 13 of the central wedge are carried by slides or blocks which are fixed to the supporting guides at the center thereof. The upper ends of these brackets 13, are of a semicircular form to oscillate in counterpart recesses formed in the slides 19, to which they are connected by straps 20, (Figures 10, and 11). The knives or wedges are fixed to the brackets 13, by a cross plate 21, inserted in a recess 22, which is slotted across the outer ends of the brackets and wedges, and held in position by means of studs 23.

The slides 19, from which the wedges 14, and 18 and 15, and 17, are suspended, are connected respectively by cross brackets or straps 24, and 25, and the wedges 14, and 18, are set or adjusted relative to the centre wedge as follows:—Two screw rods 27, and 28, are arranged at each side of the center of the apparatus to work in two nut-like projections 29, and 30, formed on or fixed to the cross brackets or straps 24 and 25. The inner end of the rod 27 of each pair, is adapted to bear against a stop 31, fixed to the overhead plate or bridge piece 10, whilst the outer end of said rod (which projects beyond the nut-like projection 29) has fixed to it a disc 32, having a number of recesses 33, formed in it, with which projections 33ª, on a disc 34, (fixed to the inner end of the rod 28) can engage. It will be obvious that if the two discs 32, and 34 of either pair of rods 27 and 28, are made to engage, on turning the rod 28 of such pair, the screw rod 27, will also be turned, pushing the knives or wedges 14 and 15 or 17 and 18, outward from the central fixed one 16, to whatever spacing is desired. Whilst the means just described ensures an accurate setting of the wedges 14 and 15, and 17 and 18, it also allows them to extend freely or move away from the centre wedge 16, and also from the wedges 15, and 17, respectively during the splitting operation in following the grain of the wood. The wedges 14, and 18, are returned to their normal position by means of a wire rope or the like 35, connected to a weight 36. A weight and a rope are provided for each of the outer wedges or knives 14 and 18 and should the wedges in the splitting operation in following the grain of the wood, slide from their adjusted positions the weights will slide the supporting brackets and the knives or wedges carried by the same, back to their adjusted positions. As each adjustable wedge has an independently mounted adjusting screw this sliding action is permitted and as the weights are connected to the outer wedges they will return both the outer and intermediate wedges to their adjusted positions if the said wedges have moved therefrom. The means just described for setting or adjusting and returning the wedges 14, and 18, to their normal position are duplicated in the case of wedges 15, and 17. The pitch of the threads on the rods 28, is double that of the threads on the rod 27, to enable the wedges 14 and 18, to travel twice the distance of the wedges 15, and 17. If desired levers may be employed for setting or adjusting the wedges 14, 15, 17 and 18.

In operation the action of the improved apparatus for splitting logs and the like is as follows:—The wedges 14, 15, 17 and 18, are set, or adjusted, as hereinbefore described, and the log to be split is placed on the plate 9, (Figures 1 and 2) which is raised by means of the ram 1, and this movement is continued until the log is forced against the wedges, and the latter has penetrated sufficiently far to complete the splitting operation. The splitting operation is greatly facilitated and the life of the wedges and brackets prolonged by the oscillating movement of the latter, whereby the wedges 14, 15, and 17, 18 (Figure 15) always follow the grain of the wood. Further, as each wedge extends completely across the log to be split, the split portions are of uniform size, and waste is avoided. If desired, the log may be subjected to a second cross splitting operation, without removing it from the plate 9, but after it has been withdrawn from the wedges. The plate 4, carrying the plate 9, is turned by the wheel 6, (Figure 3) say a quarter of a revolution, and the splitting operation repeated, in this way the original number of split portions is squared.

What I claim is:—

1. An apparatus for splitting logs and the like, consisting of a plurality of knives or wedges, fixed means for supporting one of the knives or wedges, laterally slidable means for supporting the other knives or wedges, whereby the latter are adapted to slidably adjust themselves automatically in the splitting operation, and means connected with the slidable knives or wedges for manually adjusting the same toward and from the knife or wedge of the fixed supporting means.

2. An apparatus for splitting logs and the like, including a plurality of knives or wedges, a fixed bracket pivotally supporting one of the knives or wedges, slidable brackets movable laterally of the knives or wedges and pivotally supporting the other knives or wedges, all of said wedges being free to oscillate and the knives or wedges carried by the slidable brackets being adapted to slide automatically in the splitting operation.

3. An apparatus for splitting logs and the like, including a plurality of knives or wedges, fixed means for supporting one of the knives or wedges, laterally slidable means for supporting the other knives or wedges, and means for adjusting the slidable knives or wedges toward and from the fixed supporting means of the other knives or wedges consisting of two screw rods mounted independently on the said slidable means and adapted to engage each other and turn as one.

4. An apparatus for splitting logs and the like, including a plurality of knives or wedges, fixed means for supporting one of the knives or wedges, laterally slidable means for supporting the other knives or wedges, means for adjusting the slidable knives or wedges toward and from the fixed supporting means of the other knife or wedge consisting of two screw rods mounted independently on the said slidable means and adapted to engage each other and turn as one and slidable out of such engagement, and yieldable means for automatically moving the slidable knives or wedges to return the same to their adjusted positions.

5. An apparatus for splitting logs and the like, including a plurality of knives or wedges, fixed means for supporting one of the knives or wedges, laterally slidable means for supporting the other knife or wedge, and means for adjusting the slidable knives or wedges consisting of inner and outer screw rods mounted independently on the said slidable means and provided at their adjacent ends with plates having interlocking means detachably engaging each other to permit the screw rods to turn as one and to also permit them to be disengaged from each other.

6. An apparatus for splitting logs and the like, including a plurality of knives or wedges, consisting of a central knife or wedge and intermediate and outer knives or wedges located at opposite sides of the central knife or wedge, slidable means for supporting the intermediate and outer knives or wedges and adapted to permit the same to slide towards and from the central knife or wedge, independently mounted screw rods arranged in pairs and connected with the intermediate and outer knives or wedges, the members of each pair being provided at their adjacent ends with interlocking means to permit them to turn as one, and yieldable means connected with the outer knives or wedges for urging the same inwardly towards the central knife or wedge.

In testimony whereof I have signed my name to this specification in the presence of two subscribing witnesses.

JAMES ANDREW GORRIE.

Witnesses:
MARSHALL J. MAYS,
GEO. H. RICHARDSON, Jr.